US012570022B2

(12) United States Patent
Garness et al.

(10) Patent No.: US 12,570,022 B2
(45) Date of Patent: Mar. 10, 2026

(54) HYBRID SAWHORSE

(71) Applicant: JS Products, Inc., Las Vegas, NV (US)

(72) Inventors: Richard Garness, Las Vegas, NV (US); James Stobar, Las Vegas, NV (US)

(73) Assignee: JS Products, Inc., Las Vegas, NV (US)

( * ) Notice: Subject to any disclaimer, the term of this patent is extended or adjusted under 35 U.S.C. 154(b) by 1176 days.

(21) Appl. No.: 17/507,345

(22) Filed: Oct. 21, 2021

(65) Prior Publication Data

US 2022/0126477 A1 Apr. 28, 2022

Related U.S. Application Data

(60) Provisional application No. 63/104,485, filed on Oct. 22, 2020.

(51) Int. Cl.

*B25H 1/06* (2006.01)
*B25H 1/08* (2006.01)
*B27B 21/00* (2006.01)
*E04G 1/34* (2006.01)

(52) U.S. Cl.

CPC .................................... *B27B 21/00* (2013.01)

(58) Field of Classification Search

CPC .............. B27B 21/00; B25H 1/06; E04G 1/34
USPC ........ 182/153, 152, 155, 156; 248/370, 158, 248/161, 407, 408, 157, 423, 188.1, 248/188.2, 188.5
See application file for complete search history.

(56) References Cited

U.S. PATENT DOCUMENTS 2,324,196 A * 7/1943 Crozier .................... B25H 1/06 182/201
2,652,079 A * 9/1953 Worthen .................. B25H 1/06 269/309
4,298,093 A * 11/1981 Wing ........................ E04G 1/34 182/167
4,782,917 A * 11/1988 Schulz ...................... E04G 1/34 182/182.4
5,105,862 A 4/1992 Skinner et al.
(Continued)

FOREIGN PATENT DOCUMENTS

CN 301699077 10/2011
CN 302685948 12/2013
(Continued)

OTHER PUBLICATIONS

Notice of Allowance and Search Report for ROC (Taiwan) Patent Application No. 110302068, mailed Nov. 12, 2021, 5 pages.

*Primary Examiner* — Terrell L McKinnon
(74) *Attorney, Agent, or Firm* — Snell & Wilmer L.L.P.

(57) ABSTRACT

A hybrid sawhorse has a first pair of legs connected to a first bracket and a second pair of legs connected to a second bracket and a head connected to and extending between the first and second brackets. The head is reversible, having a top with a channel therein extending parallel to a length of the head and having a bottom having a groove extending perpendicular to its length, such as for accepting workpieces in different orientations. The legs are extendable, such as to defined locked positions. The sawhorse may include spaced hooks, such as for use as a cord wrap, and may include at least one bracket located at an end of the head, such as for accepting and supporting a piece of lumber.

20 Claims, 8 Drawing Sheets

(56) References Cited

U.S. PATENT DOCUMENTS

| | | | | | |
|---|---|---|---|---|---|
| 5,427,200 | A * | 6/1995 | Yemini | B27B 17/0041 | 182/225 |
| 5,836,365 | A | 11/1998 | Derecktor | | |
| 5,904,225 | A * | 5/1999 | Patros | B25H 1/08 | 182/183.1 |
| 5,954,156 | A * | 9/1999 | Cooke | B25H 1/06 | 182/225 |
| 5,960,904 | A | 10/1999 | Ullmann | | |
| 6,164,413 | A * | 12/2000 | Sagol | B25H 1/06 | 182/182.4 |
| 6,286,824 | B1 * | 9/2001 | Sagol | B25H 1/04 | 269/900 |
| 6,298,946 | B1 * | 10/2001 | Yemini | B27B 21/00 | 182/183.1 |
| 6,488,119 | B1 * | 12/2002 | DuRapau | B25H 1/06 | 182/225 |
| D471,287 | S | 3/2003 | Sommerville et al. | | |
| 6,681,895 | B2 | 1/2004 | Virtue | | |
| 6,712,180 | B2 * | 3/2004 | Levy | B25H 1/06 | 182/225 |
| D489,738 | S | 5/2004 | Radermacher | | |
| 6,745,804 | B2 | 6/2004 | Welsh et al. | | |
| 6,997,282 | B1 * | 2/2006 | Sharp | E06C 7/081 | 182/175 |
| 7,185,738 | B1 | 3/2007 | Clepper | | |
| 7,210,510 | B2 | 5/2007 | Barclay deTolly | | |
| 7,222,648 | B2 | 5/2007 | Liu et al. | | |
| D549,749 | S | 8/2007 | Francis et al. | | |
| D584,421 | S | 1/2009 | Wise | | |
| 7,481,254 | B2 | 1/2009 | Welsh et al. | | |
| D623,672 | S | 9/2010 | Francis et al. | | |
| 8,151,939 | B2 * | 4/2012 | Osborne | B25H 1/06 | 182/186.3 |
| 8,528,870 | B2 | 9/2013 | Liu et al. | | |
| 8,684,052 | B2 | 4/2014 | Breitenbach | | |
| 8,708,103 | B2 * | 4/2014 | Bulley | B25H 1/06 | 182/186.3 |
| 9,221,168 | B2 | 12/2015 | Boyd | | |
| 9,302,288 | B2 | 4/2016 | Waterston | | |
| 9,557,000 | B2 | 1/2017 | Chang | | |
| 10,076,836 | B2 * | 9/2018 | Reinhart | B25H 1/00 | |
| 10,124,479 | B2 * | 11/2018 | Reinhart | B25H 1/06 | |
| D842,015 | S | 3/2019 | Strempke et al. | | |
| 10,252,410 | B2 | 4/2019 | Luis y Prado | | |
| D872,877 | S | 1/2020 | Hanlon | | |
| D882,824 | S | 4/2020 | Hanlon | | |
| D899,629 | S | 10/2020 | Hanlon | | |
| 10,864,625 | B2 | 12/2020 | Hanlon | | |
| 10,875,172 | B2 * | 12/2020 | Reinhart | B25H 1/06 | |
| 12,005,564 | B2 * | 6/2024 | Garness | B25H 1/06 | |
| 2009/0242329 | A1 * | 10/2009 | Krauss | B25H 1/06 | 182/153 |
| 2010/0288585 | A1 | 11/2010 | Katz et al. | | |
| 2016/0150877 | A1 * | 6/2016 | Wei Siao | F16B 7/1472 | 248/188.5 |
| 2016/0346912 | A1 * | 12/2016 | Reinhart | B25H 1/06 | |
| 2016/0368132 | A1 * | 12/2016 | Carroll | B25H 1/06 | |
| 2018/0099405 | A1 * | 4/2018 | Reinhart | B25H 1/06 | |
| 2019/0389500 | A1 * | 12/2019 | Suhling | B60B 37/10 | |
| 2022/0126436 | A1 * | 4/2022 | Garness | B25H 3/06 | |
| 2022/0126478 | A1 * | 4/2022 | Garness | B27B 21/00 | |

FOREIGN PATENT DOCUMENTS

| | | | | |
|---|---|---|---|---|
| CN | 303660132 | | 5/2016 | |
| CN | 306111150 | | 10/2020 | |
| WO | WO-2012033541 | A2 * | 3/2012 | B27B 21/00 |

* cited by examiner

HYBRID SAWHORSE

RELATED APPLICATION DATA

The present application claims priority to U.S. Provisional Application Ser. No. 63/104,485, filed Oct. 22, 2020, which application is incorporated herein in its entirety by reference.

FIELD OF THE INVENTION

The present invention relates to sawhorses and other work supports.

BACKGROUND OF THE INVENTION

A variety of work supports, such as for supporting items being worked upon with tools, are known. One well-known type of work support is a sawhorse. Sawhorses usually have a main beam that is supported by two pairs of legs. The legs are usually collapsible, allowing the sawhorse to be stored in a generally vertical position. One common design of a sawhorse is made of 2×4 lumber, where one piece of 2×4 lumber forms the main beam and other 2×4 pieces form downwardly extending pairs of legs.

These conventional sawhorses provide very basic supporting functionality, such as enabling a user to support a sheet of plywood or long pieces of lumber between two sawhorses. However, the sawhorses have various limitations. For example, they are often heavy and difficult to move, even when they can be collapsed. They also don't support round workpieces, such as pipes and the like, very well. Those types of workpieces often roll off of the main beam. Also, usually a user is using a sawhorse to support a workpiece while working on the workpiece with other tools. However, the sawhorse is not designed to support associated tools.

An improved work support, such as of the sawhorse-style, is desired.

SUMMARY OF THE INVENTION

One aspect of the invention is a work support, such as a sawhorse-style work support. The invention may comprise a hybrid sawhorse, e.g. an improved sawhorse-style work support. Additional aspects of the invention comprise a method of using one or more hybrid sawhorses.

In one embodiment, a hybrid sawhorse has a first pair of legs connected to a first bracket and a second pair of legs connected to a second bracket and a head connected to and extending between the first and second brackets. The head may be reversible, having a top with a channel therein extending parallel to a length of the head and having a bottom having a groove extending perpendicular to its length, such as for accepting workpieces in different orientations.

In one embodiment, the legs are extendable, such as to defined locked positions. Further, the pairs of legs are preferably collapsible.

The sawhorse may include a variety of additional features, such as spaced hooks, such as for use as a cord wrap, and at least one bracket located at an end of the head, such as for accepting and supporting a piece of lumber.

In one embodiment, a cross-member connects a first leg of each of the first and second pairs of legs and another cross-member connects a second leg of each of the first and second pairs of legs. A folding tray support may extend between the first and second cross-supports, such as for supporting a tray below the head.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a work support, such as having the general form of a sawhorse. In that the work support of the invention is an improvement over existing sawhorses and offering functionality not offered thereby, the invention may be referred to as a "hybrid sawhorse."

Figure 1:
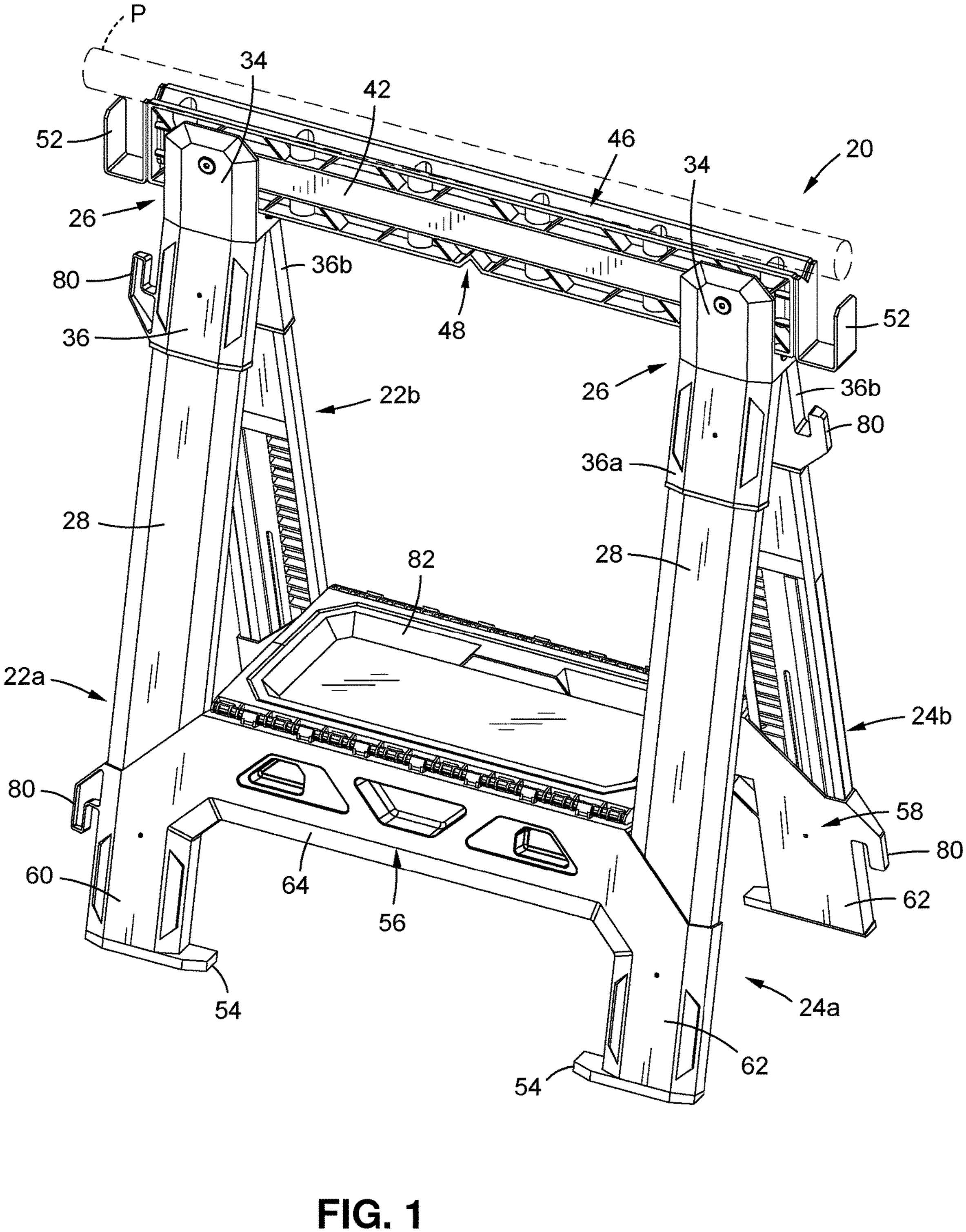
FIG. 1 is a top front perspective view of a hybrid sawhorse in accordance with an embodiment of the invention.
Figure 2:
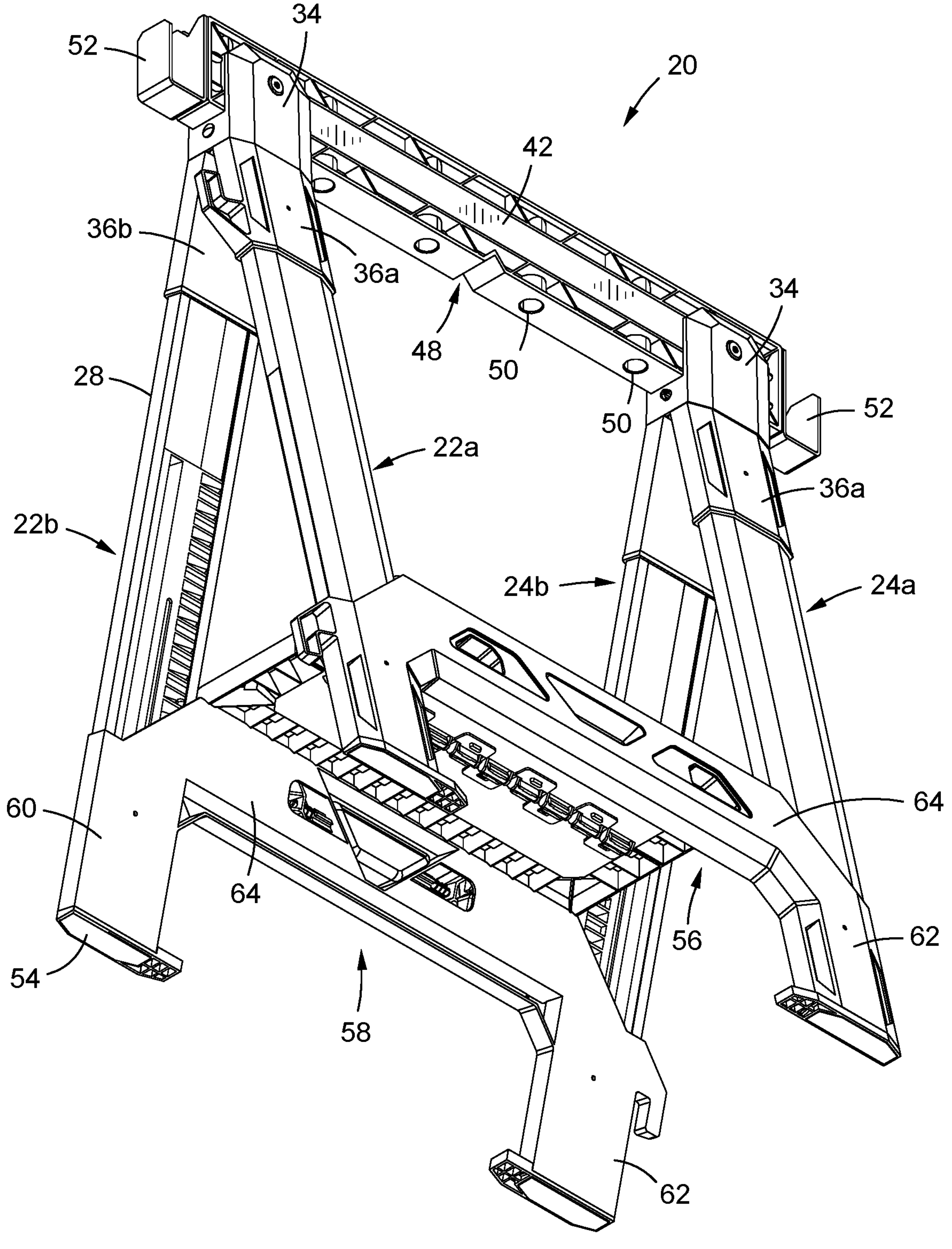
FIG. 2 is a bottom rear perspective view of the hybrid sawhorse shown in FIG. 1.

Referring first to FIGS. 1 and 2, a hybrid sawhorse 20 has a first pair of legs 22 and a second pair of legs 24. Each pair of legs 22,24 is joined at the top by a collapsible bracket 26. Additional details of the legs 22,24 will be described with reference to FIG. 6. As illustrated, the first pair of legs 22 comprises a first leg 22*a* and a second leg 22*b* and the second pair of legs 24 comprises a first leg 24*a* and a second leg 24*b*. In one embodiment, each of the legs may comprise a main portion (or main leg) 28 and an extension portion (or leg extension) 30. The main portion 28 may have a top or first end and an opposing bottom or second end. The top end may be configured to connect to the collapsible bracket 26, while the extension portion 30 may extend from the bottom end. The main portion 28 may define a channel 32, such as at an inner side thereof, for slidably accepting the extension 30 therein. In particular, as described in more detail below, the extension portion 30 may be extended into and out of the main portion 28, such as to raise and lower the hybrid sawhorse 20, as better illustrated in FIG. 3.

One end of each extension portion 30 (the end opposite a top end that fits into the main portion 28) may define a foot 54. The foot 54 may be an generally planar element which is formed with the extension portion 30 or connected thereto.

Figure 4A:
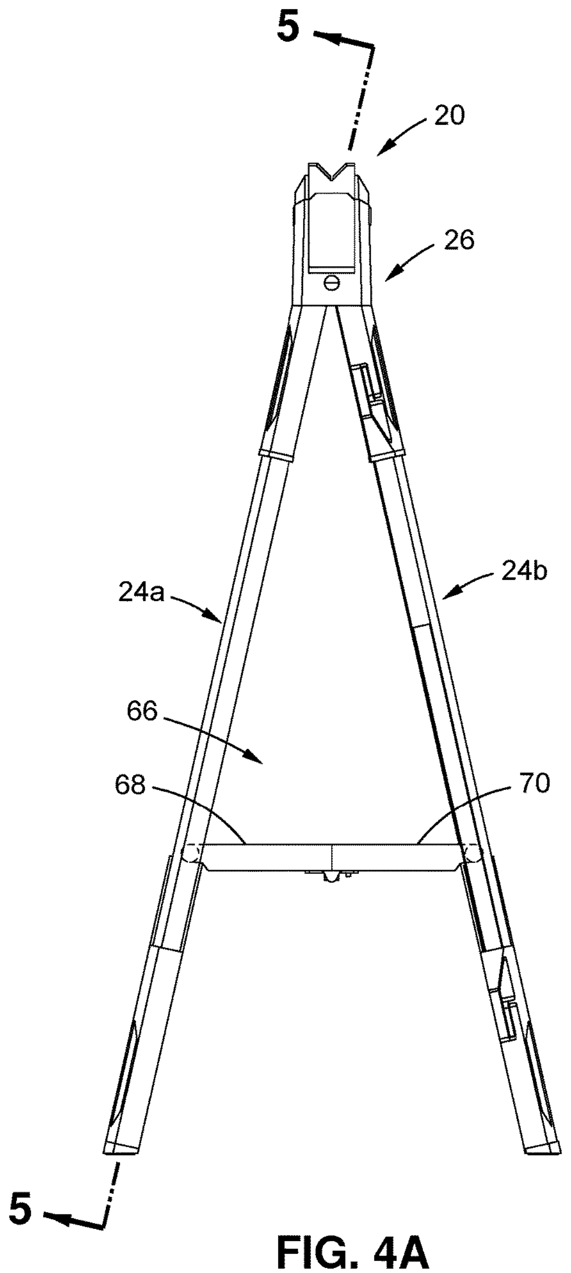
FIGS. 4A-C are end views of the hybrid sawhorse shown in FIG. 1, illustrating a collapsibility feature thereof.
Figure 4B:
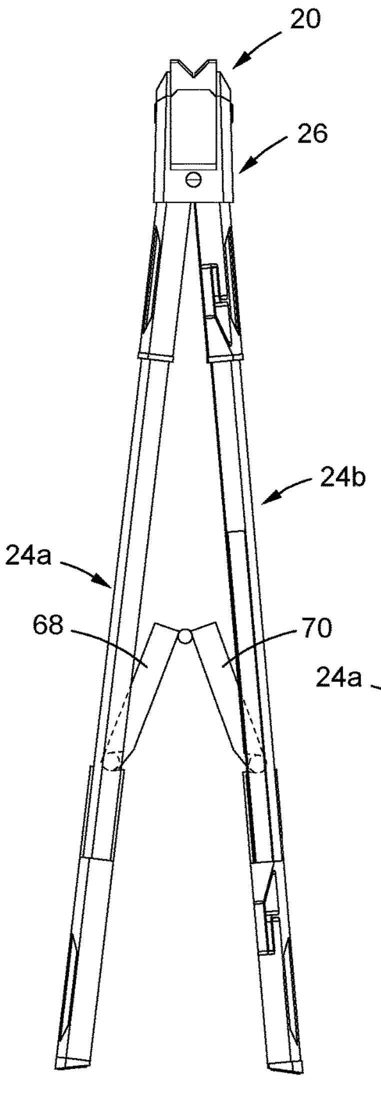
Figure 4C:
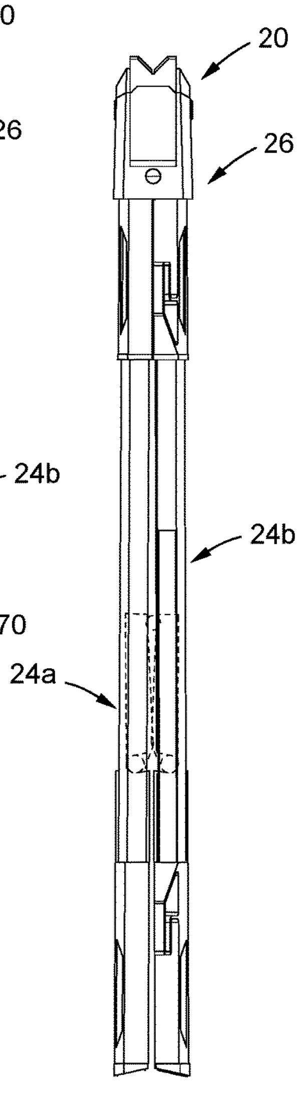
Figure 5:
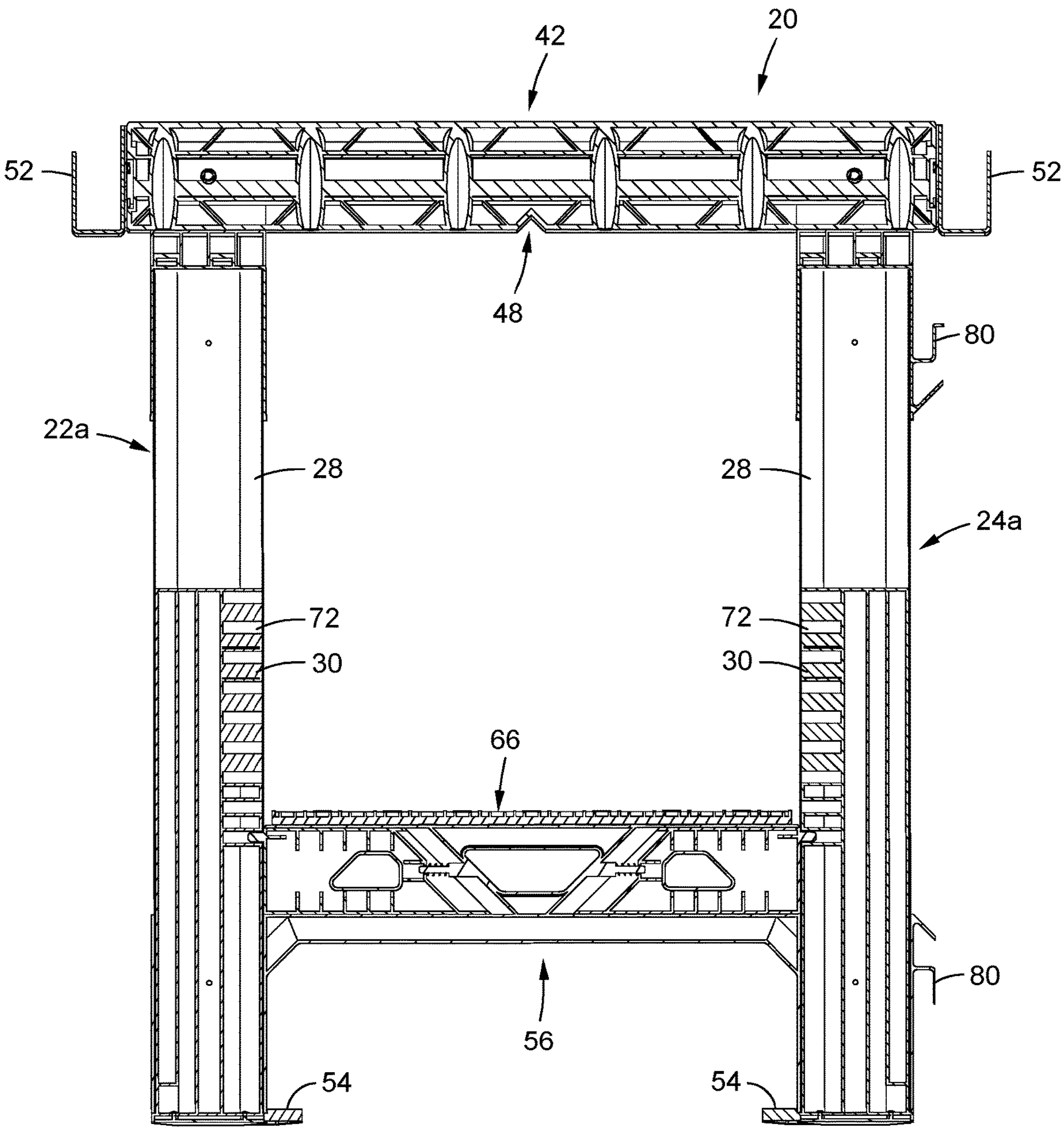
FIG. 5 is a cross-sectional view of the hybrid sawhorse illustrated in FIG. 4A taken along line 5-5 therein.
Figure 6:
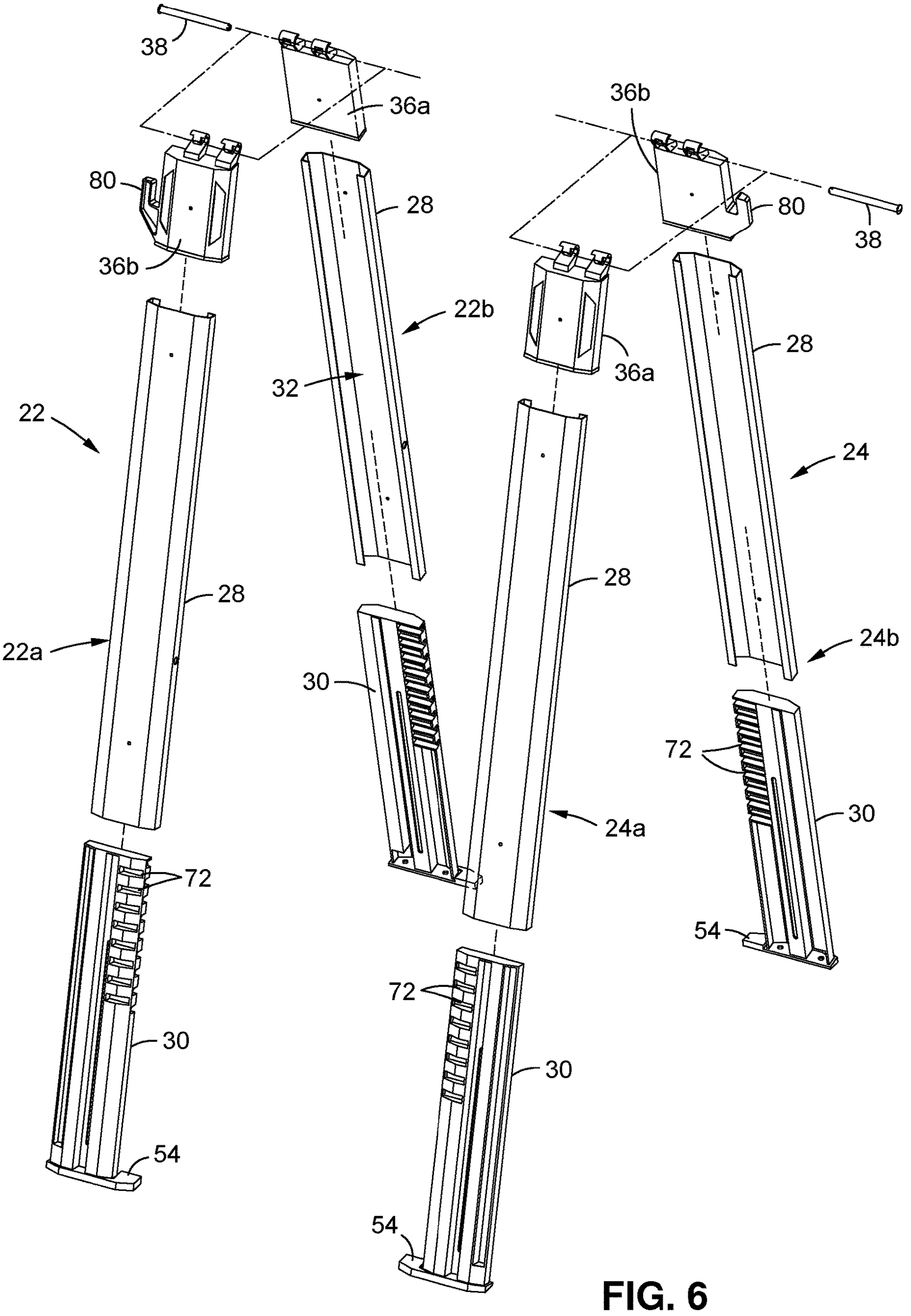
FIG. 6 is an exploded view of legs of the hybrid sawhorse shown in FIG. 1.

As illustrated in FIG. 6, the top end of each main portion 28 of each leg 22*a,b* and 24*a,b*, is connected to one of the collapsible brackets 26. As illustrated in FIGS. 1 and 6, the collapsible brackets 26 may comprise a head support 34 and first and second leg mounts 36*a,b*. The first and second legs mounts 36*a,b* of each collapsible bracket 26 are preferably movably connected to the head support 34 thereof, such as by being rotatably or hingedly connected thereto by a pin 38, and extend downwardly from the head support 34. As described in more detail below, the movable connection of the leg mounts 36*a,b* allows the legs 22,24 to be moved between extended and collapsed positions, such as illustrated in FIGS. 4A-C.

Figure 3:
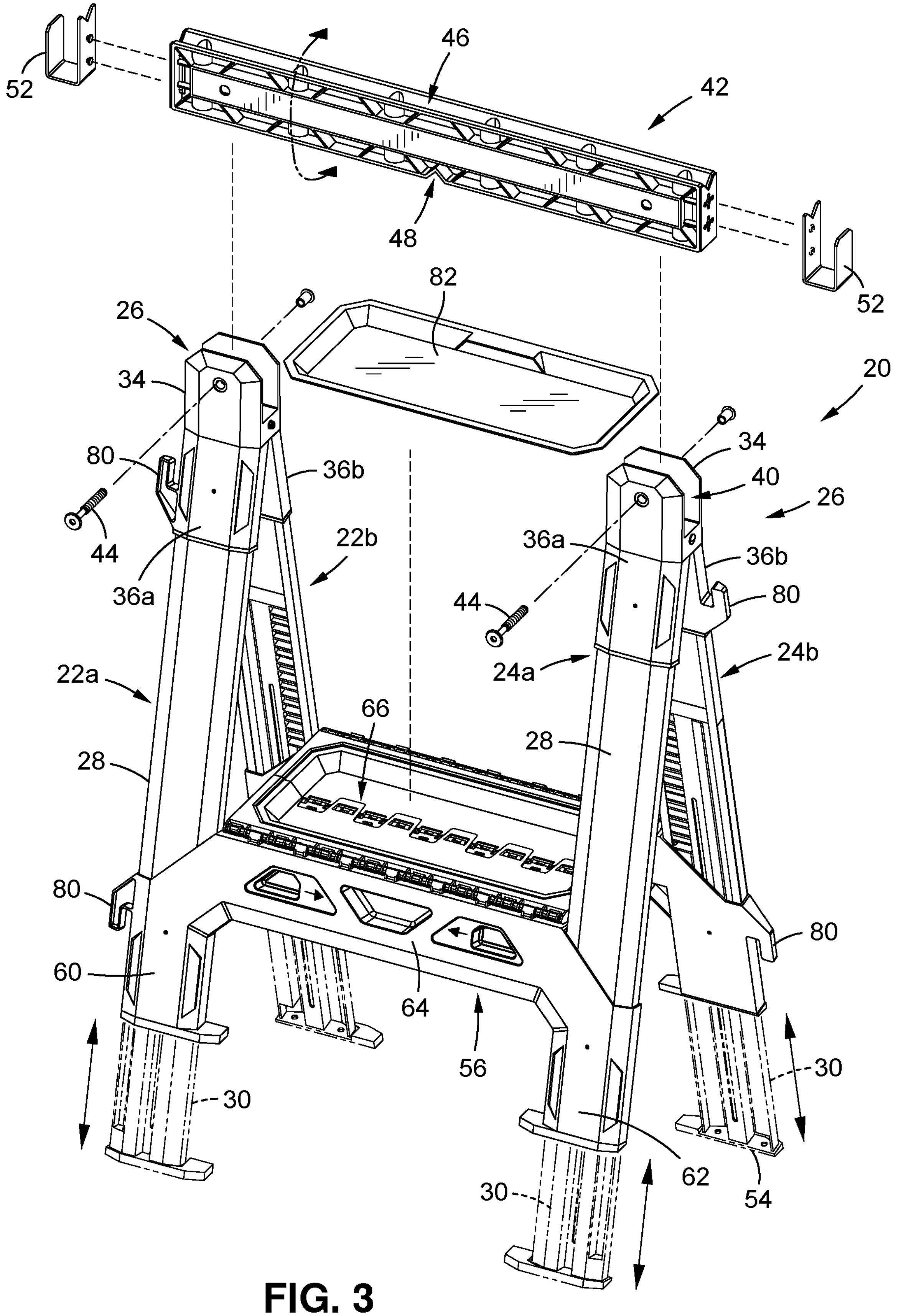
FIG. 3 is another view of the hybrid sawhorse shown in FIG. 1, with portions thereof shown in exploded or alternate position views.

The head support 34 of each collapsible bracket 26 defines an upwardly extending groove or channel 40, as best illustrated in FIG. 3. In one embodiment, the channel 40 is generally U shaped, being open on the top. A cross-member or head 42 may be supported by the two collapsible brackets 26, whereby the head 42 extends between the two brackets (and may extend beyond one or both of the brackets 26). The head 42 is preferably removable from the brackets 26 by placing it into or removing it from the channel 40 in the head support 34 portion of each collapsible bracket 26.

The head 42 may be secured to or connected to each bracket 26, such as via a pin 44 which may be extended transversely (relative to the groove 40) through the head support 34 (one end of the pin may include a fastener head and the other end of the may be threaded to engage a nut or cap at the opposing side of the bracket). Of course, other means for selectively connecting and disconnecting the head 30 from the brackets 26 might be provided. As disclosed below, this allows a user to remove the head 42 and place a different head or beam therein. Also, this allows a user to reverse the orientation of the head 42, such as to change which side thereof faces upwardly (whereby the head 42 is reversible).

As best illustrated in FIGS. 1-3, the head 42 may be generally elongate, having a pair of ends. The length of the head 42 may vary, but might be between 2 and 4 feet in length, where apertures for the mounting pins 44 may be towards the ends.

In one embodiment, a one side (the top side as illustrated in the figures) of the head 42 may include an elongate groove or channel 46 (along a length of the head/parallel to a length thereof), such as a V-shaped (or U or similarly shaped) groove in which a pipe P (as illustrated in FIG. 1) or other object may be placed (thereby extending parallel to the head).

The opposing side (the bottom side as illustrated in the figures) of the head 42 may include at least one perpendicular V-shaped notch 48, such as for supporting a pipe or other object perpendicular to the head 42 when the head 42 is flipped over and placed into the collapsible brackets 26 so that the bottom faces upwardly. In this regard, the aperture or mounting hole for each of the pins 44 is positioned so that each pin 44 will pass through the head 42 and the corresponding head support 34 regardless of the orientation of the head. As further illustrated in FIG. 2, one or more bores or openings 50 may extend into one or both sides of the head (such as the side with the notch 48), such as for receiving tools or the like.

As illustrated, a support or bracket 52 may be located at either or both ends of the head 42. The bracket 52 might comprise, for example, a generally "U" shaped bracket which is designed to support a 2×4 (whereby the width of the bracket may be 1.5-2 inches). In one embodiment, the orientation of the brackets 52 might be changeable so that they face upwardly regardless of the orientation in which the head 42 is mounted to the head supports 34. For example, the ends of the head 42 may define one or more apertures for receiving a connector or fastener which joins the bracket 52 to the head 42, where the bracket 52 can be disconnected from the head 42 and flipped over, such as when the orientation of the head 42 is reversed.

In one embodiment, the legs 22,24 are connected towards their bottom ends. In one embodiment, the two legs of each pair of legs 22,24 are connected to one another, and the pairs of legs themselves are connected. First, one leg of each pair of legs 22,24 is connected. A first cross-member 56 may extend between the first leg 22*a* of the first pair of legs 22 and the first leg 24*a* of the second pair of legs 24. A second cross-member 58 may extend between the second leg 24*a* of the first pair of legs 22*a* and the second leg 24*b* of the second pair of legs 24.

In one embodiment, each cross-member 56,58 defines a generally horizontal support 64 that extends between a first leg connector 60 and a second leg connector 62. The first and second leg connectors 60,62 may define openings for accepting the bottom or lower section of each leg.

The first and second cross-members 56,58 increase the rigidity and strength of the sawhorse 20. Among other things, the first and second cross-members 56,58 aid in keeping the legs on each side of the sawhorse 20 from separating or moving outwardly, such as under a high load placed onto the head 42.

In a preferred embodiment, a tray 82 may be positioned between the cross-members 56,58. The tray 82 may, as best illustrated in FIG. 3, be supported by a tray support 66. The tray support 66 may comprise a first body 68 movably mounted (such as rotatably or hingedly mounted) to the first cross-member 56 and a second body 70 movably mounted (such as rotatably or hingedly) to the second cross-member 58. The first and second bodies 68, 70 are then preferably movably connected to one another. In one embodiment, the first body 68 has a plurality of mounting elements which connect to a plurality of mating mounting elements on the first cross-member 56, essentially defining a hinge. The second body 70 may similarly be connected to the second cross-member 72, as may be the first and second bodies 68,70 to one another.

In other embodiments, the first body 68 may be mounted to the first cross-member 56 via a first elongate pin, the second body 70 may be mounted to the second cross-member 58 via a second elongate pin, and the first and second bodies 68,70 may be mounted to one another by a third elongate pin. Of course, the first and second bodies 68,70 might be mounted in other manners, such as by hinges, ball and socket elements, etc., to allow the functionality described below.

In one embodiment, the sawhorse 20 may include other features, such as one or more hooks 80 for receiving a cord, such as a power cord that is wound between pairs of the hooks 80. As illustrated, one hook 80 might be associated with at least one of the leg mounts 36*b* and another hook 80 might be associated with the leg connector 62 associated with the same leg. The hook 80 which is associated with the leg mount 36*a* may extend outwardly and upwardly, while the hook 80 which is associated with the leg connector 62 might extend outwardly and downwardly. In this manner, a user might wrap a cord around the pair of hooks 80, where the cord is trapped in a space defined between an arm portion of each hook 80 and the adjacent leg mount 36*b* or leg connector 62. As illustrated, one or more such sets of hooks 80 may be provided.

Figure 7:
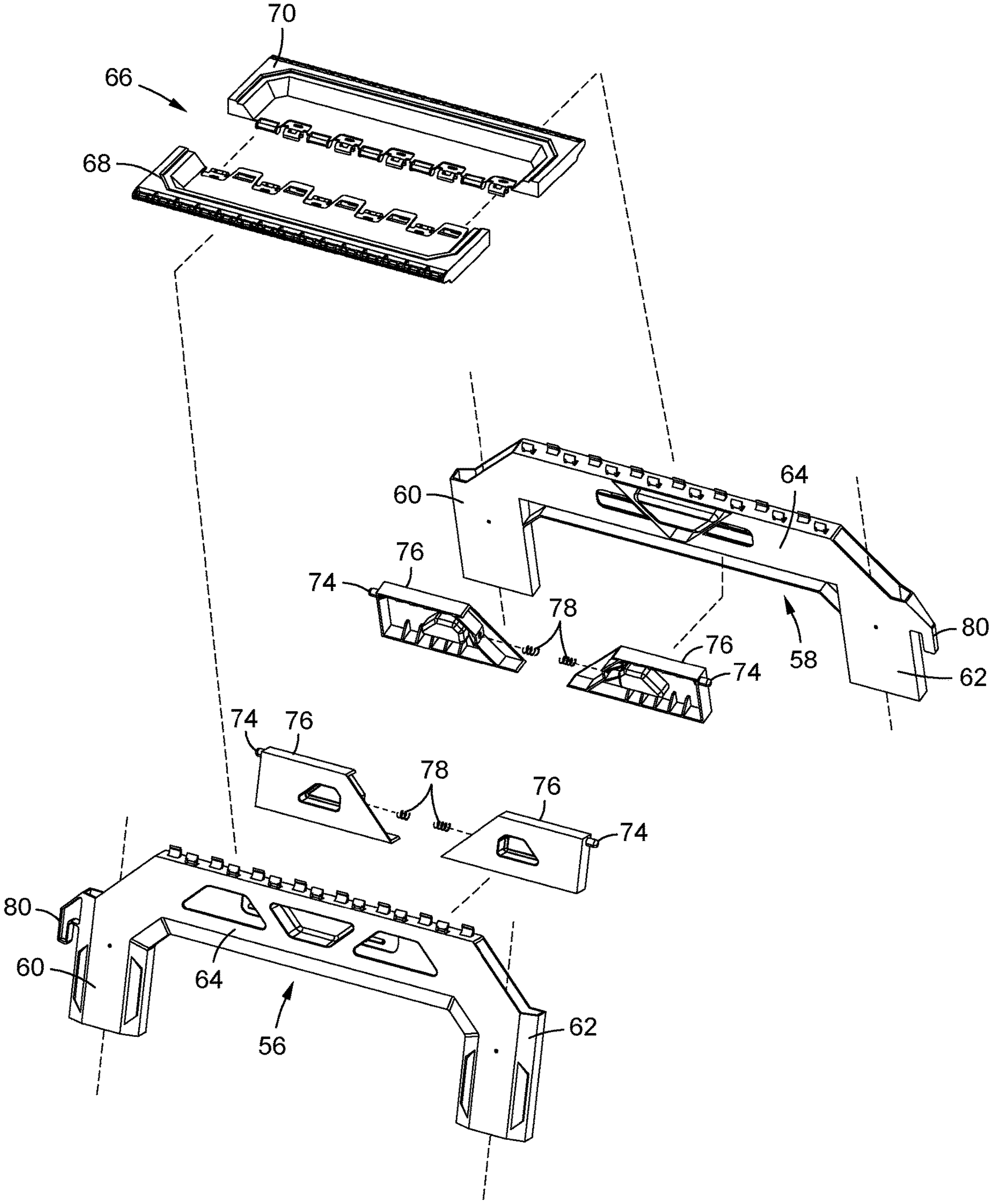
FIG. 7 is an exploded view of a tray and cross-members of the hybrid sawhorse shown in FIG. 1.

As described above, in one embodiment, the extension portion 30 of each leg is movable relative to the main portion 28. In one embodiment, the position of each extension portion 30 is adjustable, such as to particular fixed positions, such as a fully retracted position and then a plurality of spaced extended positions. As illustrated in FIG. 6, in one embodiment, each leg extension 30 defines a plurality of generally horizontal, spaced notches or slots 72. A locking mechanism may be provided for securing the leg extension 30 into a particular extended position. Referring to FIG. 7, a lock pin 74 may be selectively placed into engagement with one of the notches 72, thus locking the extension 30 into a particular position. As illustrated therein, the lock pin 74 may be mounted to or extend from a slider 76. In one embodiment, two sliders 76 may be mounted for sliding movement relative to each of the cross-members 68,70, whereby a slider 76 and corresponding pin 74 corresponds to each leg. The sliders 76 may be biased outwardly, such as by a spring 78, thus cause the sliders 76 to be biased into a position in which the associated pins 74 engage the leg extensions 30. As described, the sliders 76 may be retracted against the springs 78 in order to also retract the pins 74 and permit the extensions 30 to be moved to another position. As illustrated, the two sliders 76 which are associated with each cross-member may be positioned sufficiently close that a user can, such as with one hand, pull both sliders towards one another, thus allowing the leg extension 30 of the legs on one side of the sawhorse 20 to be moved at the same time.

Use of the hybrid sawhorse 20 will now be described. Referring to FIGS. 4A-C, the hybrid sawhorse 20 may be moved between a collapsed position, as illustrated in FIG. 4C, and an open or extended position as illustrated in FIG. 4A. In the collapsed position, the first and second legs 22*a* of the first pair of legs 22 are generally adjacent to one another, as are the first and second legs 24,*a,b* of the second pair of legs 24. Further, the tray support 66 is folded so that the first and second bodies 68,70 thereof are positioned generally next to one another. As illustrated, this allows the hybrid sawhorse 20 to have a thin depth from a front side to a back side of only several inches. The hybrid sawhorse 20 can thus be oriented vertically, such as long a wall or the like, or horizontally, such as on a shelf or the like, for storage, transport, etc.

In use, the pairs of legs 22,24 are opened (as facilitated by the hinged connection of the first and second leg mounts 36*a,b* of each collapsible bracket 26). As illustrated in FIG. 4A and FIGS. 1 and 2, in this position, the legs 22,*ab* and 24*a,b* of the pairs of legs 22,24 angle outwardly from the collapsible brackets 26, such that the distance between the bottom of each pair of legs is substantially greater than at their tops.

Figure 8:
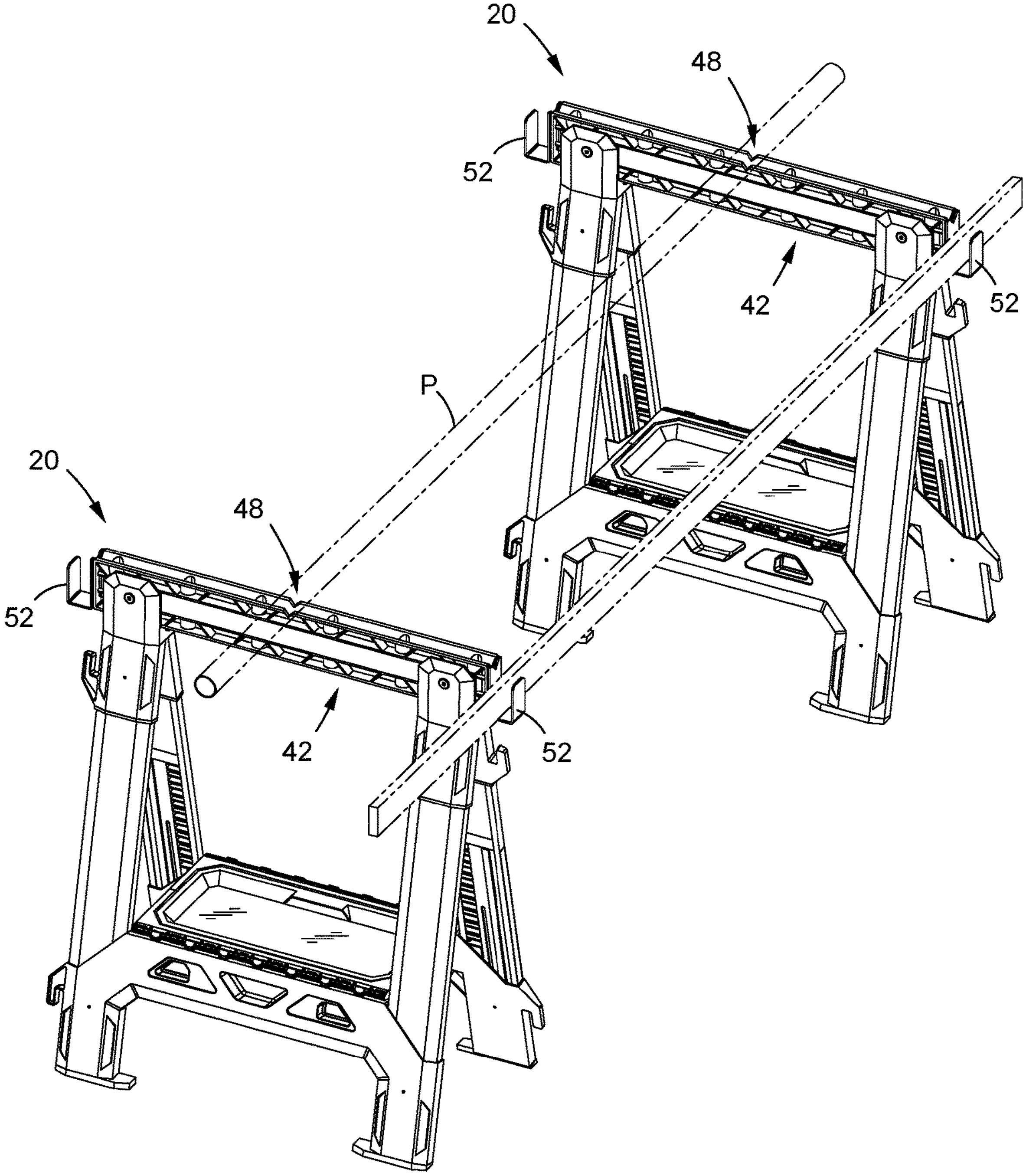
FIG. 8 illustrates aspects of using one or more hybrid sawhorses in accordance with the invention.

At this time, the user may place objects on the head 42. In one embodiment, as illustrated in FIG. 8, a user may utilize more than one hybrid sawhorse 20, such as two or more hybrid sawhorses 20 in conjunction with one another. For example, a user might support a piece of plywood or lumber on top of and between the heads 42 of two hybrid sawhorses 20. Further, as illustrated in FIG. 8, a user might place a pipe or similar element between the heads 42 of two hybrid sawhorses 20, such as in the notches 48 of the heads 42 thereof. In one embodiment, in one orientation the reversible head 42 may have an elongate channel 46 and in another orientation the reversible head 42 may have at least one transverse notch 48, whereby the head 42 is configured to support workpieces in different orientations.

Likewise, the user might support various objects with the brackets 52. For example, as illustrated in FIG. 8, a piece of lumber might be located in and supported between the brackets 52 of two spaced hybrid sawhorses 20. In this regard, one aspect of the invention is a sawhorse 20 with a reversible head 42

In one embodiment, when the hybrid sawhorse 20 is moved to its open position, the user may place the tray 82 in the tray support 66 and then place various objects on the tray 82, such as tools or the like.

The user might also wrap one or more cords (such as electrical cords) or other elements around the hooks 80 on either or both ends of the hybrid sawhorse 20.

As indicated, in one embodiment, a user may flip the head 42 over to place either the side thereof upwardly, such as to support a pipe or similar element longitudinally in the channel 46 on one side of the head 42, as illustrated in FIG. 1. The user might flip the head 42 over, such as to place tools in the bores 50 or support a pipe or element in the notch 48, such as illustrated in FIG. 8.

Advantageously, as illustrated in FIG. 3, the user may change the height of the head 42 of the hybrid sawhorse 20 by extending the leg extensions 30 downwardly. In one embodiment, the user moves each slider 76 (inwardly in the configuration illustrated) in order to move the locking pin 74 out of engagement with the corresponding leg extension 30, and then extends the leg extension to the desired position (or retract the leg to the desired position). The user may then release the sliders 76, allowing the locking pins 74 to move into engagement with one of the notches 72, thus locking the extension 30 into place.

The hybrid sawhorse 20 has various advantages. In one embodiment, various portions of the hybrid sawhorse 30 may be constructed from a durable plastic material. For example, various portions of the hybrid sawhorse 30 may be molded from plastic. As illustrated in FIG. 6, the hybrid sawhorse 20 may essentially be modular, where the various components, such as the legs 22,24, may be made of a plurality of elements which slidingly engage or are otherwise connectable and disconnectable. This allows the hybrid sawhorse 20 to be made of a number of parts that are smaller in size/dimension, including to allow the hybrid sawhorse 20 to be shipped in a smaller profile.

In one embodiment, the head 42 might be removed and replaced with another head, such as one made from wood or other material, including where such other head has other shapes or features. As one example, because the head 42 is supported in the channel 32 of each head support 34, the user might remove the head 32 and place a 2×4 or similar element therein as the head. For example, if the user is engaged in certain cutting or drilling operations and does not want to damage the head 42, the user might place piece of lumber in its place.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A sawhorse comprising:

a first pair of legs connected to a first bracket;

a second pair of legs connected to a second bracket; and a reversible head extending along a longitudinal length from a first end face to a second end face, extending along a lateral width from a first side face to a second side face, and extending vertically between a top face and a bottom face, said reversible head detachably connected to said first and second brackets, said reversible head having an elongate channel extending vertically into said top face and parallel to said longitudinal length of said head, and said reversible head having a notch extending vertically into said bottom face, parallel to said lateral width, through said first side face, and through said second side face.

2. The sawhorse in accordance with claim 1, wherein said first bracket comprises a head support and first and second leg mounts extending therefrom and said second bracket comprises a head support and first and second leg mounts extending therefrom.

3. The sawhorse in accordance with claim 1, wherein said head support of said first bracket and said head support of said second bracket each define a head accepting channel.

4. The sawhorse in accordance with claim 1, wherein each of said legs comprises a main portion and a leg extension movably mounted to said main portion.

5. The sawhorse in accordance with claim 1, wherein said leg extension is movable between a retracted position and one or more extended positions.

6. The sawhorse in accordance with claim 1, further comprising a locking mechanism which selectively maintains said leg extension in a selected one of said extended positions.

7. The sawhorse in accordance with claim 6, wherein said leg extension comprises a plurality of spaced notches and said locking mechanism comprises a pin for selectively engaging said plurality of spaced notches, said pin biased towards said leg extension.

8. The sawhorse in accordance with claim 7, wherein said pin is connected to a slider, said slider movable between a retracted position in which said pin does not engage said leg extension and an extended position in which said pin engages one of said plurality of spaced notches.

9. The sawhorse in accordance with claim 1, wherein said reversible head has a first end disposed proximate said first end face and a second end disposed proximate said second end face, said reversible head further comprising a bracket connected to said reversible head at one of said first end and said second end.

10. The sawhorse in accordance with claim 9, wherein said bracket is generally U shaped.

11. The sawhorse in accordance with claim 9, wherein said bracket is detachably connected to said reversible head and can be flipped over relative to said reversible head.

12. The sawhorse in accordance with claim 1, further comprising a first cross-member extending between a first leg of said first pair of legs and a first leg of said second pair of legs, and a second cross-member extending between a second leg of said first pair of legs and a second leg of said second pair of legs.

13. The sawhorse in accordance with claim 12, wherein said first cross-member is located between a first end and a second end of said first leg of said first pair of legs and a first end and a second end of said first leg of said second pair of legs, and a second cross-member is located between a first end and a second end of said second leg of said first pair of legs and a first end and a second end of said second leg of said second pair of legs.

14. The sawhorse in accordance with claim 13, wherein said first ends of said first and second legs of said first pair of legs are connected to said first bracket and said first ends of said first and second legs of said second pair of legs are connected to said second bracket.

15. The sawhorse in accordance with claim 12, further comprising a first hook located on first bracket and a second hook located on said first cross-member.

16. The sawhorse in accordance with claim 12, further comprising a tray support extending between said first and second cross-members.

17. The sawhorse in accordance with claim 14, wherein said tray support is foldable.

18. The sawhorse in accordance with claim 1, wherein the first pair of legs is connected to the first bracket at a top side of the first pair of legs, each leg of the first pair of legs is configured to move with respect to the other leg between a collapsed position and an extended position, and wherein the second pair of legs is connected to the second bracket at a top side of the second pair of legs, each leg of the second pair of legs is configured to move with respect to the other leg between the collapsed position and the extended position.

19. The sawhorse in accordance with claim 3, wherein the reversible head is reversible about a longitudinal axis such that said top face may be disposed vertically above said bottom face in a first position, said bottom face configured to be received into said head accepting channel in said first position, and such that the bottom face may be disposed vertically above said top face in a second position, said top face configured to be received into said head accepting channel in said second position.

20. A sawhorse comprising:

a reversible head having a top face, a bottom face, a first side face, and a second side face, the top face defining a first workpiece receiving feature and the bottom face defining a second workpiece receiving feature;

a first pair of legs connected to a first bracket defining a first channel having an open top;

a second pair of legs connected to a second bracket defining a second channel having an open top, the first channel and the second channel configured to receive said reversible head in a first position in which the top face is above the bottom face of the reversible head such that the first workpiece feature is oriented upwardly and configured to receive said reversible head in a second position in which the bottom face is above the top face such that the second workpiece feature is oriented upwardly; and a connector extendable through at least one of the first bracket or the second bracket and into an aperture extending through the first side face and the second side face of the reversible head to selectively connect the reversible head to the first bracket or the second bracket.

* * * * *